UNITED STATES PATENT OFFICE.

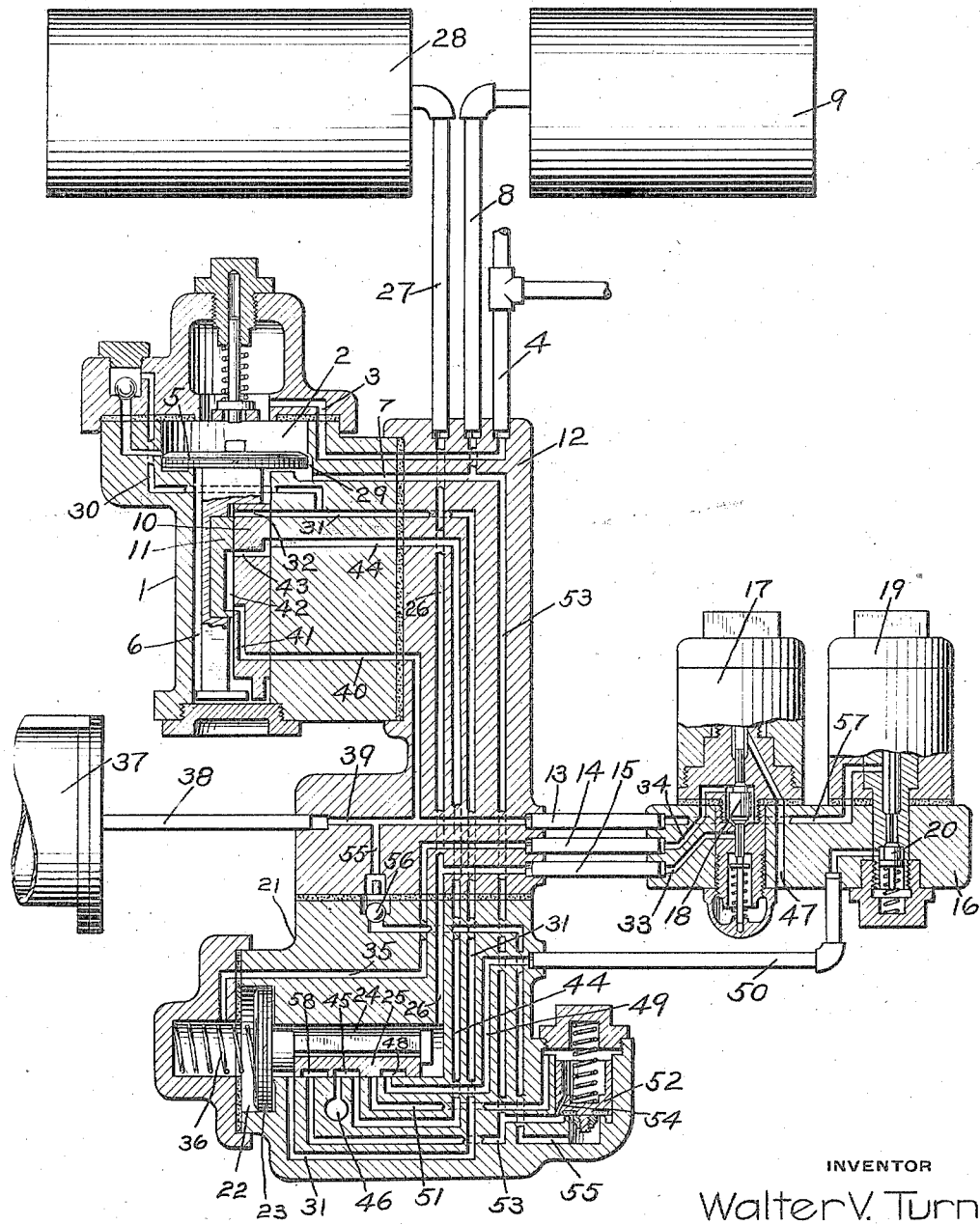

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

1,294,974.   Specification of Letters Patent.   Patented Feb. 18, 1919.

Application filed October 6, 1916. Serial No. 124,010.

*To all whom it may concern:*

Be it known that I, WALTER V. TURNER, a citizen of the United States, residing at Wilkinsburg, in the county of Allegheny and State of Pennsylvania, have invented new and useful Improvements in Electropneumatic Brakes, of which the following is a specification.

This invention relates to electro-pneumatic brakes, in which the brakes are controlled both electrically and by means of fluid under pressure.

It has heretofore been proposed to employ an electro-pneumatic brake equipment in which a valve device is provided for effecting the application and release of the brakes, and a controlling device adapted to simultaneously vary the fluid pressure on said valve device electrically and pneumatically to operate the same.

By this means, should the electric portion fail for any reason, a brake would still be obtained by the usual pneumatic operation. With an equipment of the above character, the brake application and release valve device being operated to apply and release the brakes electrically as well as pneumatically, the electric application and release is slower than would be the case with a direct acting electric brake.

One object of my invention is to provide an electro-pneumatic brake equipment in which the brakes are normally applied and released electrically without moving the pneumatic brake controlling valve device, but in case of failure of the electric portion, the controlling valve device automatically operates to control the brakes.

It has also been proposed to employ a supplemental reservoir for obtaining a graduated release of the brakes and for other purposes and normally this reservoir communicates with the auxiliary reservoir. If the supply of fluid for controlling the brakes electrically is taken from the auxiliary reservoir and the supplemental reservoir is connected to same, there may not be a sufficient reduction in pressure on the auxiliary reservoir side of the pneumatic brake controlling valve device to prevent its movement by the reduction in train pipe pressure which is made simultaneously with the electric operation.

Another object of my invention is therefore to provide means for cutting off communication from the supplemental reservoir to the auxiliary reservoir upon effecting an electric application of the brakes.

Another object of my invention is to provide means for holding the brakes applied in case of failure of the electric brake control during an electric application of the brakes.

Other objects and advantages will appear in the following more detailed description of the invention.

In the accompanying drawing, the single figure is a diagrammatic view of an electropneumatic brake equipment embodying my invention.

According to the construction shown in the drawing, in order to control the brakes pneumatically, an equalizing valve device may be provided, comprising a casing 1, having a piston chamber 2 connected by passage 3 to the brake pipe 4 and containing a piston 5, and having a valve chamber 6 connected by passage 7 and pipe 8 to auxiliary reservoir 9 and containing a main slide valve 10 and an auxiliary slide valve 11, mounted on and having a movement relative to the main valve, said valves being operated by piston 5.

The equalizing valve casing 1 may be applied to a pipe bracket 12, and for controlling the brakes electrically, a magnet valve casing 16 may be provided having pipes 13, 14, and 15 connected to the pipe bracket 12.

The magnet valve casing 16 is provided with a release magnet 17 for operating a double beat valve 18 and a service magnet 19 for operating a valve 20.

There is also applied to the pipe bracket 12, a valve casing 21 containing a valve mechanism, the principal object of which is to cut off communication between the supplemental reservoir and the auxiliary reservoir when an electric service application of the brakes is made.

The cut-off valve casing 21 has a piston chamber 22 containing a piston 23 and a valve chamber 24 connected by a passage 26 and pipe 27 to the supplemental reservoir 28 and containing a slide valve 25 adapted to be operated by piston 23.

In operation, when fluid under pressure is supplied to the brake pipe 4, air flows to piston chamber 2 and through the usual feed groove 29 charging valve chamber 6 and auxiliary reservoir 9, through passage 7 and pipe 8. Fluid also flows from the brake pipe through passage 30 to passage 31 which registers in release position with port 32 in the main slide valve 10 and through passage 31 to valve chamber 24, the slide valve 25 being in release position. From valve chamber 24, fluid flows through passage 26 and pipe 27, charging the supplemental reservoir 28 with fluid under pressure.

In release, the release magnet 17 is deënergized, and the double beat valve 18 is at its inner seat, so that supplemental reservoir passage 26 is connected by pipe 15 and passage 33 with passage 34 and pipe 14 which communicates through a passage 35 with piston chamber 22. It will thus be seen that in release, supplemental reservoir air is supplied to opposite sides of piston 23, which is therefore held in release position by the spring 26.

The brake cylinder 37 is connected to the exhaust in release position through pipe 38, passage 39, passage 40, port 41 in slide valve 10, cavity 42, port 43, passage 44, cavity 45 in the cut-off valve 25 and exhaust port 46, from which it will be seen that the brake cylinder exhaust is controlled both by the equalizing valve device and the cut-off valve device.

If it is desired to effect an electric service application of the brakes, both the service magnet 19 and the release magnet 17 are energized.

The energization of the release magnet 17 operates to shift the double beat valve 18 to its outer seat, in which communication from the supplemental reservoir to the piston chamber 22 is cut off and communication is opened from said chamber to exhaust port 47. Supplemental reservoir pressure in valve chamber 24 then operates piston 23 and valve 25 is shifted, so that cavity 48 connects passage 49 and pipe 50 leading to electric service valve 20 with passage 51 leading to one side of a valve piston 52. The valve piston 52 is subject in its seated position over a restricted area to auxiliary reservoir pressure supplied through passage 53 and normally fluid pressures on opposite sides of the valve piston are maintained equal by flow through a restricted port 54 in the valve piston.

The energization of service magnet 19 opens valve 20 and fluid is then vented from the outer face of valve piston 52 to passage 57 connected by pipe 13 to brake cylinder passage 39, so that auxiliary reservoir pressure acting on the opposite side opens the valve piston and permits the flow of fluid from the auxiliary reservoir passage 53 to a passage 55 containing a check valve 56 and leading to brake cylinder passage 39. Fluid is therefore supplied from the auxiliary reservoir directly to the brake cylinder without moving the equalizing valve device.

While the service valve 20 might be arranged to supply fluid to the brake cylinder directly, it is preferable to employ the relay valve 52, so as to secure a more rapid and direct flow to the brake cylinder.

The movement of the cut-off valve 25 also closes communication from passage 44 to exhaust port 46, so that the brake cylinder exhaust is closed and since passage 31 is cut off from valve chamber 24, it will be evident that communication between the supplemental reservoir and the auxiliary reservoir is closed, so that in an electric service application of the brakes, since only fluid from the auxiliary reservoir is vented to the brake cylinder, the fluid pressure in valve chamber 6 will reduce with the auxiliary reservoir fast enough to prevent movement of the equalizing piston by the reduction in brake pipe pressure which is also taking place by reason of the movement of the brake valve to service position.

The movement of the cut-off valve 25 also connects passages 31 and 53 through cavity 58, so that in addition to the usual flow of fluid from the brake pipe to the auxiliary reservoir by way of passage 30 and port 32, there will be an additional flow through passage 31, cavity 58, and passage 53 to the auxiliary reservoir. In this way the auxiliary reservoir pressure is maintained more nearly equal to brake pipe pressure during an electric service application, so that if it should be desired to graduate the release of the brakes, a prompt action of the equalizing valve device will be assured.

If, in making an electric service application of the brakes, the release magnet should fail to act, the cut-off valve 25 will not be shifted and as a consequence, the communication through which the electric service valve 20 vents fluid from the auxiliary reservoir supply valve 52 will remain closed and thus fluid will not be supplied from the auxiliary reservoir to the brake cylinder electrically, but since the auxiliary reservoir pressure is not reduced by flow to the brake cylinder and since the brake pipe pressure is reduced when an electric application of the brakes is made, the equalizing valve device will be shifted to effect a pneumatic application of the brakes in the usual manner, so that a brake application will still be obtained.

If during an electric service application of the brakes, the release magnet should fail by loss of current or otherwise, the cut-off valve device will be returned to release position by the movement of the double beat valve 18 to its upper seat, but since in the release position of the cut-off valve 25, communication is opened from the supplemental reservoir to the auxiliary reservoir, fluid will be supplied from the supplemental reservoir to the auxiliary reservoir and to valve chamber 6 and this will increase the pressure in said valve chamber so as to overcome the reduced brake pipe pressure acting on piston 5 and consequently the equalizing piston will move the graduating valve 11 so as to cut off communication from the brake cylinder to brake cylinder exhaust port 46 and thus prevent the release of the brakes.

Having now described my invention, what I claim as new and desire to secure by Letters Patent, is:—

1. In an electro-pneumatic brake, the combination with a brake cylinder, brake pipe, auxiliary reservoir, and a valve device subject to the opposing pressures of the auxiliary reservoir and brake pipe for effecting an application of the brakes, of electrically controlled means for effecting the supply of fluid from the auxiliary reservoir to the brake cylinder to apply the brakes independently of said valve device and upon reducing the brake pipe pressure simultaneously with effecting the operation of said electrically controlled means.

2. In an electro-pneumatic brake, the combination with a brake cylinder, brake pipe, auxiliary reservoir, and a valve device subject to the opposing pressures of the auxiliary reservoir and brake pipe for effecting an application of the brakes, of a valve for effecting the supply of fluid from the auxiliary reservoir to the brake cylinder independently of said valve device, and a magnet for operating said valve, upon manually effecting the energization of said magnet and at the same time effecting a reduction in brake pipe pressure.

3. In an electro-pneumatic brake, the combination with a brake cylinder, brake pipe, auxiliary reservoir, and a valve device subject to the opposing pressures of the auxiliary reservoir and brake pipe for effecting an application of the brakes, of a supplemental reservoir normally in communication with the auxiliary reservoir, electrically controlled means for supplying fluid from the auxiliary reservoir to the brake cylinder, and means for cutting off communication between the supplemental reservoir and the auxiliary reservoir upon operation of said electrically controlled means.

4. In an electro-pneumatic brake, the combination with a brake cylinder, brake pipe, auxiliary reservoir, and a valve device subject to the opposing pressures of the auxiliary reservoir and brake pipe for effecting an application of the brakes, of a supplemental reservoir, normally in communication with the auxiliary reservoir, electrically controlled means for supplying fluid from the auxiliary reservoir to the brake cylinder, a manually controlled device for simultaneously effecting a reduction in brake pipe pressure and the operation of said electrically controlled means, and means adapted upon operation of said electrically controlled means for cutting off communication from the supplemental reservoir to the auxiliary reservoir.

5. In an electro-pneumatic brake, the combination with a brake cylinder, an auxiliary reservoir, and a supplemental reservoir normally in communication with the auxiliary reservoir, of an electrically controlled device for supplying fluid from the auxiliary reservoir to the brake cylinder and means adapted upon operation of said electrically controlled device for cutting off communication from the supplemental reservoir to the auxiliary reservoir.

6. In an electro-pneumatic brake, the combination with a brake cylinder, auxiliary reservoir, and supplemental reservoir, of an electrically controlled device for supplying fluid from the auxiliary reservoir to the brake cylinder, means for controlling communication from the supplemental reservoir to the auxiliary reservoir, and an electrically controlled device for effecting the operation of said means to close communication between said reservoirs.

7. In an electro-pneumatic brake, the combination with a brake cylinder, auxiliary reservoir, and supplemental reservoir, of an electrically controlled device for supplying fluid from the auxiliary reservoir to the brake cylinder, means for controlling communication from the supplemental reservoir to the auxiliary reservoir and from the brake cylinder to the exhaust, and an electrically controlled device for effecting the operation of said means.

8. In an electro-pneumatic brake, the combination with a brake cylinder, brake pipe, auxiliary reservoir, and supplemental reservoir, of an electrically controlled device for effecting the supply of fluid from the auxiliary reservoir to the brake cylinder, means for controlling communication from the supplemental reservoir to the auxiliary reservoir, from the brake cylinder to the exhaust, and from the brake pipe to the auxiliary reservoir, and an electrically controlled device for effecting the operation of said means.

9. In an electro-pneumatic brake, the combination with a brake cylinder, brake pipe, auxiliary reservoir, and supplemental reservoir, of a service magnet valve device for effecting the supply of fluid from the auxiliary reservoir to the brake cylinder, a release magnet valve device, and a cut-off valve device adapted to be operated by said release magnet valve device for closing communication from the supplemental reservoir to the auxiliary reservoir, from the brake cylinder to the exhaust and for opening communication from the brake pipe to the auxiliary reservoir.

10. In an electro-pneumatic brake, the combination with a brake cylinder, auxiliary reservoir, and supplemental reservoir, of a magnet valve device for controlling the admission of fluid from the auxiliary reservoir to the brake cylinder, a release magnet valve device, and a cut-out valve device normally establishing communication between the supplemental reservoir and the auxiliary reservoir and adapted to be operated by the release magnet valve device for closing said communication.

11. In an electro-pneumatic brake, the combination with a brake cylinder, auxiliary reservoir, and supplemental reservoir, of a magnet valve device for controlling the admission of fluid from the auxiliary reservoir to the brake cylinder, a cut-out valve device for controlling communication from the supplemental reservoir to the auxiliary reservoir, and a magnet controlled valve adapted upon energization to effect the operation of said cut-out valve device for closing said communication and upon deënergization for opening said communication.

12. In an electro-pneumatic brake, the combination with a brake cylinder, brake pipe, auxiliary reservoir, supplemental reservoir, and a valve device subject to the opposing pressures of the auxiliary reservoir and brake pipe for effecting an application of the brakes, of a service magnet valve device for effecting the admission of fluid from the auxiliary reservoir to the brake cylinder, a cut-out valve device for controlling communication between the supplemental reservoir and the auxiliary reservoir, a release magnet valve device adapted upon energization to operate said cut-out valve device and close said communication, and means for simultaneously energizing said release magnet and effecting a reduction in brake pipe pressure.

13. In an electro-pneumatic brake, the combination with a brake cylinder, brake pipe, auxiliary reservoir, supplemental reservoir, and a valve device subject to the opposing pressures of the auxiliary reservoir and brake pipe for controlling communication from the auxiliary reservoir to the brake cylinder and from the brake cylinder to the exhaust, of a service magnet valve device for effecting the admission of fluid from the auxiliary reservoir to the brake cylinder, a cut-out valve device comprising a valve for controlling communication from the supplemental reservoir to the auxiliary reservoir, and from the brake cylinder to the exhaust and a piston subject on one side to supplemental reservoir pressure for operating said valve, and a release magnet valve device adapted in release position to supply fluid from the supplemental reservoir to the opposite side of said piston and upon energization to vent fluid from said piston for operating said cut-out valve to close communication from the supplemental reservoir to the auxiliary reservoir and from the brake cylinder to the exhaust.

14. In an electro-pneumatic brake, the combiantion with a brake pipe, of electrically controlled means for effecting an application of the brakes, and a valve device subject to brake pipe pressure and operative by a reduction in brake pipe pressure only upon failure of said electrically controlled means for effecting an application of the brakes.

In testimony whereof I have hereunto set my hand.

WALTER V. TURNER.